(12) United States Patent
Youngquist

(10) Patent No.: US 6,651,481 B1
(45) Date of Patent: Nov. 25, 2003

(54) METHOD AND APPARATUS FOR CHARACTERIZING PRESSURE SENSORS USING MODULATED LIGHT BEAM PRESSURE

(75) Inventor: Robert C Youngquist, Cocoa, FL (US)

(73) Assignee: The United States of America as represented by the United States National Aeronautics and Space Administration, Washington, DC (US)

( * ) Notice: Subject to any disclaimer, the term of this patent is extended or adjusted under 35 U.S.C. 154(b) by 77 days.

(21) Appl. No.: 09/983,045

(22) Filed: Oct. 12, 2001

(51) Int. Cl.$^7$ ............................................. G01L 27/00
(52) U.S. Cl. ...................... 73/1.64; 250/252.1; 381/58
(58) Field of Search ................................ 73/1.64, 1.57, 73/1.15, 1.59, 1.85, 702, 705; 702/98, 103, 104; 250/252.1; 356/243.1; 381/58

(56) References Cited

U.S. PATENT DOCUMENTS

| 4,248,093 A |   | 2/1981  | Andersson et al. |           |
|-------------|---|---------|------------------|-----------|
| 4,347,410 A |   | 8/1982  | Schomer et al.   |           |
| 4,412,445 A |   | 11/1983 | Spellicy         |           |
| 4,531,138 A | * | 7/1985  | Endo et al.      | 347/51    |
| 4,727,420 A |   | 2/1988  | Kohda et al.     |           |
| 4,856,317 A | * | 8/1989  | Pidorenko et al. | 73/1.64   |
| 4,979,798 A | * | 12/1990 | Lagakos et al.   | 385/12    |
| 5,010,586 A | * | 4/1991  | Mortimore et al. | 359/169   |
| 5,101,664 A | * | 4/1992  | Hockaday et al.  | 73/705 X  |
| 5,107,847 A | * | 4/1992  | Knute et al.     | 73/705 X  |
| 5,146,780 A |   | 9/1992  | Zuckerwar et al. |           |
| 5,218,197 A | * | 6/1993  | Carroll          | 250/227.19|
| 5,262,884 A | * | 11/1993 | Buckholz         | 359/151   |
| 5,265,479 A | * | 11/1993 | Cook et al.      | 73/705 X  |
| 5,344,320 A |   | 9/1994  | Inbar et al.     |           |
| 5,828,768 A |   | 10/1998 | Eatwell et al.   |           |
| 5,841,017 A |   | 11/1998 | Baraket et al.   |           |
| 6,101,258 A |   | 8/2000  | Killion et al.   |           |
| 6,154,551 A |   | 11/2000 | Frenkel          |           |

FOREIGN PATENT DOCUMENTS

| GB | 2186360  | * | 8/1987  | .................. 73/760 |
| JP | 4-72520   | * | 3/1992  | ........... G01D/21/00 |
| JP | 10-267773 | * | 10/1998 | ............. G01L/9/00 |

\* cited by examiner

*Primary Examiner*—Thomas P. Noland
(74) *Attorney, Agent, or Firm*—Randall M. Heald; John C. Mannix; Gary G. Borda

(57) ABSTRACT

Embodiments of apparatuses and methods are provided that use light sources instead of sound sources for characterizing and calibrating sensors for measuring small pressures to mitigate many of the problems with using sound sources. In one embodiment an apparatus has a light source for directing a beam of light on a sensing surface of a pressure sensor for exerting a force on the sensing surface. The pressure sensor generates an electrical signal indicative of the force exerted on the sensing surface. A modulator modulates the beam of light. A signal processor is electrically coupled to the pressure sensor for receiving the electrical signal.

20 Claims, 1 Drawing Sheet

METHOD AND APPARATUS FOR CHARACTERIZING PRESSURE SENSORS USING MODULATED LIGHT BEAM PRESSURE

ORIGIN OF THE INVENTION

The invention described herein was made by an employee of the United States Government and may be manufactured and used by or for the Government of the United States of America for governmental purposes without the payment of any royalties thereon or therefor.

TECHNICAL FIELD

The present invention relates generally to the field of sensors and, in particular, to characterizing sensors.

BACKGROUND

Sensor characterization typically involves determining the sensitivity, noise threshold, frequency response, etc. of the sensor as well as sensor uniformity, e.g., variations in the sensitivity, noise threshold, frequency response, etc. as measured at different locations on a sensing surface or by several substantially identical sensors. Determination of sensor sensitivity, noise threshold, frequency response, etc. is also useful for sensor calibration. In situations involving sensors, such as highly sensitive microphones or other highly sensitive pressure sensors, for measuring small pressures, such as ultrasonic signals and audio frequency signals in air, sensor characterization and calibration is often difficult and painstaking.

For example, one method used for characterizing and calibrating sensors for measuring small pressures involves using a calibrated pressure sensor, e.g., calibrated using a standardized procedure at the U.S. National Institute of Standards and Technology, to calibrate a sound source for generating pressure waves in air at audio and ultrasonic frequencies. Calibration of the sound source involves exposing the calibrated pressure sensor to the sound source at various amplitudes and frequencies of sound and measuring an electrical output, e.g., voltage or current, of the calibrated sensor at each of the amplitudes and frequencies of sound. Then, an uncalibrated pressure sensor, e.g., substantially identical to the calibrated sensor, is exposed to the calibrated sound source at the various amplitudes and frequencies, and an electrical output of the uncalibrated sensor is compared to the electrical output of the calibrated sensor at each of the amplitudes and frequencies.

A number of problems are associated with using sound sources for characterizing and calibrating sensors. These problems include dispersion of the sound waves, echoes that may reach the sensor, and losses to the air in the case of ultrasonic sound waves. Moreover, few single sound sources have the bandwidth to cover the bandwidth required for characterizing and calibrating both audio and ultrasonic frequency sensors, so multiple sound sources are usually used for characterizing and calibrating both audio and ultrasonic frequency sensors. Further, sound sources are difficult to aim at specific locations on a sensing surface making it difficult to determine the sensitivity, noise threshold, frequency response, etc. at different locations on the sensing surface and thereby the uniformity of the sensing surface.

For the reasons stated above, and for other reasons stated below which will become apparent to those skilled in the art upon reading and understanding the present specification, there is a need in the art for apparatuses and methods for characterizing and calibrating sensors for measuring small pressures that do not employ sound sources for generating pressure waves.

SUMMARY

The above-mentioned problems with using sound sources for generating pressure waves for characterizing and calibrating sensors for measuring small pressures and other problems are addressed by embodiments of the present invention and will be understood by reading and studying the following specification. Embodiments of the present invention provide apparatuses and methods that use light sources instead of sound sources for characterizing and calibrating sensors for measuring small pressures to mitigate many of the above-mentioned problems with using sound sources for generating pressure waves.

More particularly, in one embodiment, an apparatus for characterizing a pressure sensor is provided that has a light source for directing a beam of light on a sensing surface of the pressure sensor for exerting a force on the sensing surface. The pressure sensor generates an electrical signal indicative of the force exerted on the sensing surface. The apparatus has a modulator for modulating the beam of light at a plurality of frequencies and intensities. A signal processor is electrically coupled to the pressure sensor for receiving the electrical signal.

In another embodiment, a method for characterizing pressure sensors is provided. The method includes directing a modulated beam of light onto a sensing surface of the pressure sensor for exerting a force on the sensing surface. The method also includes generating an electrical output using the sensing surface indicative of the force exerted on the sensing surface.

In yet another embodiment, a method for calibrating a pressure sensor is provided that includes modulating a beam of light at a plurality of frequencies and intensities. The method also includes calibrating the beam of light so that the beam of light respectively exerts each of a plurality of known pressures on a sensing surface of the pressure sensor at each of the plurality of frequencies and intensities. Moreover, the method includes exposing the sensing surface of the pressure sensor to the beam of light so that the beam of light exerts each of the plurality of known pressures on the sensing surface. The method also includes generating respectively each of a plurality of electrical outputs using the sensing surface for each of the plurality of known pressures exerted on the sensing surface.

DETAILED DESCRIPTION

Figure 1:
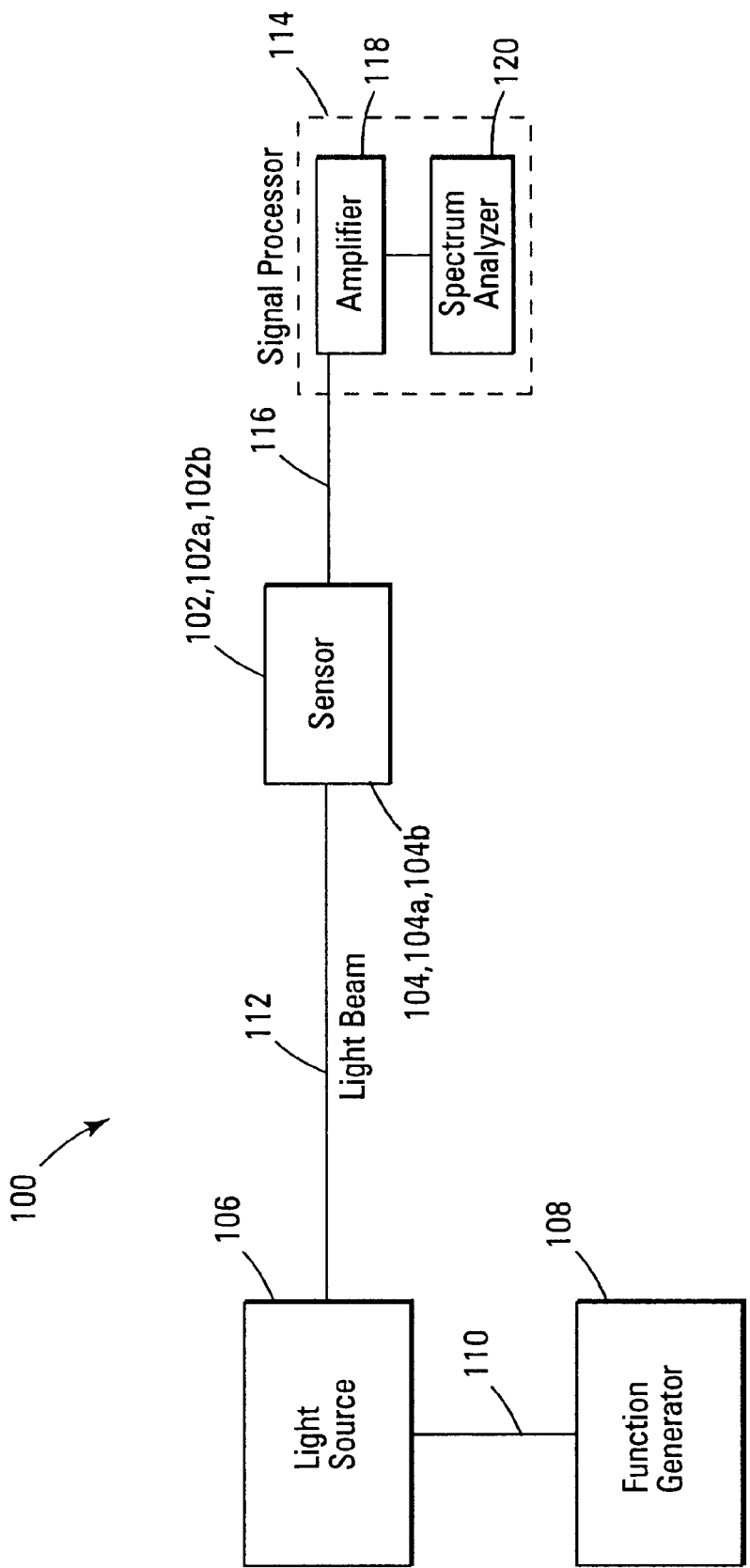
FIG. 1 is a block diagram of an embodiment of an apparatus for characterizing a pressure sensor according to the teachings of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Apparatus 100, shown in FIG. 1, is an embodiment of an apparatus of the present invention for characterizing pressure sensors, such as sensor 102 (e.g., a microphone). Sensor 102 is used to measure small pressures, such as pressures produced by sound waves impinging on a sensing surface (e.g., surface 104 of sensor 102) at audio and ultrasonic frequencies. In one embodiment, surface 104 is of a material, e.g., polyvinylidene fluoride, that when deflected by a force generates an electrical signal. In another embodiment, sensor 102 is either an uncalibrated sensor 102a or a calibrated sensor 102b that is calibrated, for example, at the U.S. National Institute of Standards and Technology using a standardized procedure.

Apparatus 100 includes a light source 106, e.g., a laser, laser diode, light emitting diode, or the like. A modulator, e.g., function generator 108, is connected to light source 106 by a cable 110. Function generator 108 transmits modulated electrical signals of various amplitudes and frequencies to light source 106 via cable I 10. The modulated electrical signals cause light source 106 to emit a modulated light beam 112, consisting of light waves of various intensities (or powers) and frequencies, that impinges on surface 104 of sensor 102. In one embodiment, modulated light beam 112 is sinusoidal.

It will be appreciated by those skilled in the art that light carries momentum and thus exerts a force on any surface the light impinges on, where the force increases with the intensity of the light. Optical heating caused by light impinging on a surface can also cause a force to be exerted on the surface. In these ways, modulated light beam 112 exerts a force on surface 104. This force causes surface 104 to deflect, which in turn causes sensor 102 to generate an electrical signal that is indicative of the force. The electrical signal is transmitted to a signal processor 114 using a cable 116. In one embodiment, signal processor 114 includes an amplifier 118 for amplifying the electrical signal. In another embodiment, signal processor 114 includes a spectrum analyzer 120.

In one embodiment of a method for characterizing sensor 102, modulated light beam 112 is directed at various locations on surface 104 of sensor 102 for exerting a force on the various locations. The electrical signals generated by the force exerted on the various locations on surface 104 are transmitted to signal processor 114 for processing. In one embodiment, processing the electrical signals includes spectrum analyzer 120 comparing the electrical signals to determine, for example, the variation of the frequency response on surface 104. In another embodiment, modulated light beam 112 is sequentially directed onto surface 104 of each of several sensors 102, and the electrical signals generated by the force exerted by modulated light beam 112 on the respective sensors 102 are compared at spectrum analyzer 120 to determine, for example, the variation of the frequency response of sensors 102.

Another embodiment provides a method for calibrating uncalibrated sensor 102a. This involves calibrating modulated light beam 112 so that modulated light beam 112 exerts each of a number of known pressures on surface 104a of uncalibrated sensor 102a. Calibrating modulated light beam 112 includes exposing calibrated sensor 102b to modulated light beam 112 at various frequency and amplitude settings of function generator 108 of a range of frequency and amplitude settings. In one embodiment, the range of frequencies is approximately zero to several MHz. At each frequency and amplitude setting, modulated light beam 112 impinges on surface 104b of calibrated sensor 102b and exerts a force on surface 104b. The force causes surface 104b to generate an electrical signal, e.g., a voltage or current, that is transmitted to signal processor 114 for processing. In one embodiment, processing the electrical signal includes spectrum analyzer 120 averaging each electrical signal to obtain an average electrical quantity, such as a voltage, current, or the like, for each amplitude and frequency setting.

In one embodiment, each of the average electrical quantities is an average voltage. Each of the average voltages is input into the calibration of calibrated sensor 102b to respectively calculate an average pressure for each of the average voltages and thus an average pressure for each amplitude and frequency setting. Each of the average pressures and each of the amplitude and frequency settings are then used to obtain an average pressure calibration for modulated light beam 112. Inputting amplitude and frequency settings of function generator 108 into the average pressure calibration gives a set of known average pressures. Each of the known average pressures corresponds to a frequency and amplitude setting of function generator 108 that causes modulated light beam 112 to exert that average pressure on surface 104b of calibrated sensor 102b.

After calibrating modulated light beam 112, uncalibrated sensor 102a is exposed to modulated light beam 112, and modulated light beam 112 exerts each of a set of known average pressures on surface 104a of uncalibrated sensor 102a. This is accomplished by setting function generator 108 at each of a set of amplitudes and frequencies that respectively cause modulated light beam 112 to exert each of the set of known average pressures on surface 104a, as determined from the average pressure calibration for light beam 112. At each known pressure, modulated light beam 112 impinges on surface 104a of uncalibrated sensor 102a to produce, for example, a voltage signal that is transmitted to signal generator 114. Spectrum analyzer 120 of signal generator 114 averages each voltage signal to obtain an average voltage for each known pressure. Each of the average voltages and each of the known pressures are used to obtain an average pressure versus average voltage calibration for uncalibrated sensor 102a.

CONCLUSION

Embodiments of the present invention have been described. The embodiments provide apparatuses and methods that use light sources instead of sound sources for characterizing and calibrating sensors for measuring small pressures to mitigate many of the problems with using sound sources.

Although specific embodiments have been illustrated and described in this specification, it will be appreciated by those of ordinary skill in the art that any arrangement that is calculated to achieve the same purpose may be substituted for the specific embodiment shown. This application is intended to cover any adaptations or variations of the present invention. For example, in one embodiment, a network analyzer can be used in place of function generator 108 and spectrum analyzer 120. In another embodiment, amplifier 118 is included in spectrum analyzer 120. In other embodiments, amplifier 118 is included in the network analyzer.

What is claimed is:

1. An apparatus for characterizing a pressure sensor, comprising:
   a light source for directing a beam of light on a sensing surface of the pressure sensor for exerting a force on the sensing surface, the pressure sensor generating an electrical signal indicative of the force exerted on the sensing surface by the beam of light;
   a modulator for modulating the beam of light; and
   a signal processor electrically coupled to the pressure sensor for receiving the electrical signal.

2. The apparatus of claim 1, wherein the light source is one of a laser diode, a light emitting diode, or a laser.

3. The apparatus of claim 1, wherein the signal processor comprises a spectrum analyzer.

4. An apparatus for characterizing a pressure sensor, comprising:
   a light source for directing a beam of light on a sensing surface of the pressure sensor for exerting a force on the sensing surface, the pressure sensor generating an electrical signal indicative of the force exerted on the sensing surface;
   a modulator for modulating the beam of light, wherein the modulator comprises a function generator; and
   a signal processor electrically coupled to the pressure sensor for receiving the electrical signal.

5. A method for characterizing pressure sensors, the method comprising:
   directing a modulated beam of light onto a sensing surface of a pressure sensor for exerting a force on the sensing surface; and
   generating an electrical output using the sensing surface indicative of the force exerted on the sensing surface.

6. The method of claim 5, wherein directing the modulated beam of light onto the sensing surface of the pressure sensor comprises directing the modulated beam of light onto a plurality of locations on the sensing surface.

7. The method of claim 6, wherein generating an electrical output using the sensing surface comprises respectively generating each of a plurality of electrical outputs at each of the plurality of locations on the sensing surface.

8. The method of claim 7, further comprising comparing each of the plurality of electrical outputs to other of the plurality of electrical outputs.

9. The method of claim 5, further comprising processing the electrical output of the pressure sensor.

10. The method of claim 5, further comprising modulating a beam of light to produce the modulated beam of light.

11. The method of claim 5, wherein directing the modulated beam of light onto the sensing surface of the pressure sensor comprises directing the modulated beam of light onto each of at least two sensing surfaces respectively of each of at least two pressure sensors.

12. The method of claim 11, further comprising comparing an electrical output of one of the at least two pressure sensors to an electrical output of the other of the at least two pressure sensors.

13. The method of claim 5, further comprising determining a calibration from the electrical output at each of a plurality of amplitudes and frequencies of the modulated beam of light.

14. The method of claim 5, further comprising generating a beam of light.

15. The method of claim 14, wherein generating a beam of light comprises using one of a laser, a light emitting diode, or a laser diode.

16. A method for calibrating a pressure sensor, the method comprising:
   modulating a beam of light at a plurality of frequencies and intensities;
   calibrating the beam of light so that the beam of light respectively exerts each of a plurality of known pressures on a sensing surface of the pressure sensor at each of the plurality of frequencies and intensities;
   exposing the sensing surface of the pressure sensor to the beam of light so that the beam of light exerts each of the plurality of known pressures on the sensing surface; and generating respectively each of a plurality of electrical outputs using the sensing surface for each of the plurality of known pressures exerted on the sensing surface.

17. The calibration method of claim 16, further comprising determining a calibration respectively using each of a plurality of electrical outputs generated from the sensor and each of the plurality of known pressures.

18. The calibration method of claim 16, wherein calibrating the beam of light comprises exposing a sensing surface of a calibrated pressure sensor to the beam of light to generate each of a plurality of electrical outputs from the calibrated pressure sensor.

19. The calibration method of claim 18, wherein calibrating the beam of light comprises respectively calculating each of a plurality of pressures from each of the plurality of electrical outputs generated from the calibrated pressure sensor using a calibration.

20. The method of claim 16, further comprising generating a beam of light.

* * * * *